United States Patent
Byun

(10) Patent No.: US 7,212,575 B2
(45) Date of Patent: May 1, 2007

(54) METHOD FOR DECODING OF MPEG-4 VIDEO

(75) Inventor: Hyun II Byun, Seoul (KR)

(73) Assignee: C&S Technology, Seoul (KR)

( * ) Notice: Subject to any disclaimer, the term of this patent is extended or adjusted under 35 U.S.C. 154(b) by 93 days.

(21) Appl. No.: 10/287,358

(22) Filed: Nov. 4, 2002

(65) Prior Publication Data

US 2003/0147469 A1    Aug. 7, 2003

(30) Foreign Application Priority Data

Feb. 5, 2002    (KR) .................. 10-2002-0006563

(51) Int. Cl.
*H04N 7/12*    (2006.01)
(52) U.S. Cl. .............................................. 375/240.27
(58) Field of Classification Search ..............
375/240.12–240.16, 240.23–240.28, 240.03,
375/240.18, 240.2; *H04N 7/12*
See application file for complete search history.

(56) References Cited

U.S. PATENT DOCUMENTS

| | | | |
|---|---|---|---|
| 6,404,817 B1 * | 6/2002 | Saha et al. ............. | 375/240.27 |
| 6,704,363 B1 * | 3/2004 | Kim ....................... | 375/240.27 |
| 2001/0007575 A1 * | 7/2001 | Mori et al. ............ | 375/240.03 |
| 2002/0093595 A1 * | 7/2002 | Sugiyama et al. ..... | 375/240.24 |
| 2003/0152149 A1 * | 8/2003 | Denolf .................. | 375/240.24 |

* cited by examiner

*Primary Examiner*—Richard Lee
(74) *Attorney, Agent, or Firm*—Harness, Dickey & Pierce, P.L.C.

(57) ABSTRACT

A decoding method for MPEG-4 digital video having data-partitioned simple profile, and more particularly to a method of constituting an MPEG-4 video decoder having a reasonable error resilience by properly using error resistant algorithms under the circumstances where irrecoverable errors can be added at transmission channel. A method for decoding a bit stream of data-partitioned MPEG-4 video in an error-prone transmission environment characterized by comprising the steps of: searching for a start code of the following VP/VOP in an inputted bit stream; decoding the following VP/VOP headers succeeding the VP/VOP start code; checking the error existence in macroblock addresses (MBAs) using the MBAs of current VP and the following VP; scanning a VP, whose MBA range is determined through previous steps, for error-detection; and carrying out a normal decoding or an error concealment on each macroblock of current VP according to the VP scan result.

22 Claims, 10 Drawing Sheets

| Class | SR0 | SR1 | | | | | |
|---|---|---|---|---|---|---|---|
| | | EC=0 | EC=1 | | | | |
| | | | Intra MB | | | Inter MB | |
| | | | UIDV=0 | | UIDV=1 | $DCA_x=1$ | $DCA_x=0$ |
| | | | $DCA_x=1$ | $DCA_x=0$ | | | |
| Number | 1 | 2 | 3 | 4 | 5 | 6 | 7 |
| Error Concealment Method | A | B | C | D | B | E | |

| Class | SR2 | | | | | | SR3 | | | |
|---|---|---|---|---|---|---|---|---|---|---|
| | I-VOP | | | P-VOP | | | | I-VOP | | P-VOP |
| | UIDV=0 | | UIDV=1 | Intra MB | | Inter MB | | | | |
| | $DCA_x=1$ | $DCA_x=0$ | | $DCA_x=1$ | $DCA_x=0$ | $DCA_x=1$ | $DCA_x=0$ | $DCA_x=1$ | $DCA_x=0$ | $DCA_x=1$ | $DCA_x=0$ |
| Number | 8 | 9 | 10 | 11 | 12 | 13 | 14 | 15 | 16 | 17 | 18 |
| Error Concealment Method | B | C | D | B | C | B | E | B | C | B | F |

Fig. 12

| Error Concealment Method | A | B | C | D | E | F |
|---|---|---|---|---|---|---|
| not_coded | N/C | 0 | 1 | N/C | N/C | 1 |
| mb_type | N/C | 3 | N/C | N/C | N/C | N/C |
| cbp | N/C | 0 | N/C | 0 | 0 | N/C |
| ac_pred_flag | N/C | 0 | N/C | 0 | 0 | N/C |
| Motion Vector Concealment | 0 | 0 | 0 | 0 | 0 | 1 |
| | 0 | 1 | 0 | 0 | 0 | 0 |
| $DCA_x$ | Intra MB : 1 | 0 | N/C | 1 | N/C | N/C |

N/C : No change

Fig. 13

METHOD FOR DECODING OF MPEG-4 VIDEO

BACKGROUND OF THE INVENTION

1. Field of the Invention

The present invention relates to a method for decoding of MPEG-4 digital video having data-partitioned simple profile. In more detail, it relates to a method of constituting an MPEG-4 video decoder having a reasonable error resilience with low price by properly using error resistant algorithms provided by MPEG-4 under the circumstances in which irrecoverable errors can be added at transmission channel such as wireless transmission circumstances.

With this method, MPEG-4 error resilience tools are embodied as hardware without a large increase of design price or complexity. And thus, the quality of received video under wireless transmission circumstances can be maintained over a certain level.

2. Description of the Related Art

Since MPEG-4, which is designed to be able to transmit at an extremely low bit rate and completely standardized in 1999, is considered to be used under wireless transmission circumstances, it includes tools having resilience against irrecoverable errors possibly occurred at channels. These tools are mandatory options to be provided from simple profile.

MPEG-4 standard provides three error resistant algorithms as follows:

First, a resynchronization marker is used for impeding an error propagation during a bit stream decoding by placing a fixed length code, composed of a specific bit pattern, in a bit stream and thereby indicating a point, where decoding can be started correctly. A resynchronization marker is composed of a unique bit pattern inconsistent with any combination of variable length codes. With using the resynchronization markers, a frame is divided into several video packets(see FIG. 1), and thus even when an error is occurred in a video packet, next video packet can be decoded independently.

Second, data partition is a technology that improves the error resilience by rearranging the information transferring sequence in a video packet, and it is provided for better error concealment. If data partition is being applied, the important portion of a macroblock header information contained in a video packet is placed in the first half of the video packet and the rest is placed in the second half. And then, by inserting a specific bit pattern between the two parts, one can check the existence of error in the first-half information(See FIG. 2).

Third, reversible variable length encoding is a technology of localizing errors in a video packet. With this technology, if an error is detected in forward decoding, it seeks for the resynchronization marker of next video packet and decodes backward therefrom(See FIG. 3).

Annex E of MPEG-4 standard is based on error resistant algorithms described above and presents decoder behaviors for error correction as follows:

1. A general error detection includes the cases of: a bit stream, not listed on variable length code(VLC) table, being inputted; more than 64 discrete cosine transform (DCT) coefficients being decoded in a block; and an inconsistent resynchronization header information being inputted(For example, in case of a quantization coefficient being out of range or the macroblock address(MBA) of previous video packet(VP) being larger than that of current VP, and so on.).

2. In resynchronization algorithm, if an error is detected in a bit stream, a decoder seeks for the starting point of the following resynchronization(a video object plane(VOP) start code or a resynchronization marker). And then, it checks the error existence in VP using the bit pattern following the VP. At this time, if more than 8 of '1' are existing consecutively at the end of a VP or the shape is different from "0111 . . . ", it means that an error is contained in the VP. Here, missing blocks may be replaced with the same block from the previous frame.

3. A decoding method for reversible variable length codes with an RVLC algorithm, when an error is detected in a bit stream, is as follows:

3.1 Looking for the criterion for error detection in forward/backward decoding, the following cases are regarded to contain an error:

when a bit stream not listed on an RVLC table is found, and when more than 64 DCT coefficients are decoded in a block.

3.2 A bit stream is first decoded in the forward direction in an RVLC decoding strategy. If no error is detected, it is assumed that the bit stream is valid and decoding for the VP is ended.

However, if an error is detected, two-way decoding is being applied. At this time, by using the following strategies, it can be decided that which bits shall be abandoned and which bits shall be used. Here, the following definitions are used:

L: number of total bits corresponding to DCT coefficient part in a VP.

N: number of total macroblocks in a VP.

L1: number of decodable bits before error detection in forward decoding.

L2: number of decodable bits before error detection in backward decoding.

N1: number of fully-decodable macroblocks in forward direction($0 \leq N1 \leq (N-1)$).

N2: number of fully-decodable macroblocks in backward direction($0 \leq N2 \leq (N-1)$).

f_mb(S): number of macroblocks decoded when S bit(s) can be decoded forwards. If one bit or more can be decoded in a macroblock, f_mb(S) is counted.

b_mb(S): number of macroblocks decoded when S bit(s) can be decoded backwards. If one bit or more can be decoded in a macroblock, b_mb(S) is counted.

T: 90.

(1) Strategy 1: When (L1+L2)<L and (N1+N2)<N;

Use first f_mb(L1−T) macroblocks and last b_mb(L2−T) macroblocks for decoding and abandon the rest, which is the portion indicated by oblique lines in FIG. 4.

(2) Strategy 2: When (L1+L2)<L and (N1+N2)$\geq$N;

Use first (N−N2−1) macroblocks and last (N−N1−1) macroblocks for decoding and abandon the rest, which is the portion indicated by oblique lines in FIG. 5.

(3) Strategy 3: When (L1+L2)$\geq$L and (N1+N2)<N;

Use first (N−b_mb(L2)) macroblocks and last (N−f_mb (L1)) macroblocks for decoding and abandon the rest, which is the portion indicated by oblique lines in FIG. 6.

(4) Strategy 4: When (L1+L2)$\geq$L and (N1+N2)$\geq$N;

Use first Min{N−b_mb(L2), N−N2−1} macroblocks and last Min{N−f_mb(L1), N−N1−1} macroblocks for decoding and abandon the rest, which is the portion indicated by oblique lines in FIG. 7. Here, Min{A, B} represents the minumum value of A and B.

However, the prior art described above causes the following problems:

1) Since it starts decoding a VP as soon as a bit stream of the VP is inputted, it decodes the VP without knowing the number of macroblocks contained therein. And so, if it decodes a first part containing errors without acknowledging them, decoded length becomes different due to the errors, and as a result, errors are not detected and DC_MARKER or MOTION_MARKER may not be detected either.

Therefore, it occasionally decodes more bit stream than the actual length of a first part to detect an error in the first part header, and this causes decoding time increase.

Besides, since a DC_MARKER or a MOTION_MARKER is represented by the combination of VLCs used for a first part, if the number of macroblocks in VP is not known, a DC_MARKER or a MOTION_MARKER can not be properly used until their locations are detected with consuming extra time.

2) In case that an error is detected during a VP texture decoding, the decoded output up to the error-detected location becomes useless.

Therefore, in a channel with a comparably high bit error rate(BER) like a wireless transmission system, the immediate start of decoding a VP possibly causes decoding time increase.

In addition, in case that a VP decoding requires accesses to various internal/external memories in actual decoding circuit, it increases the overall power consumption.

3) In the RVLC decoding strategies described in FIG. 4~FIG. 7, the meanings of f_mb(S) and b_mb(S) can not be directly used in an actual decoding system. This is because the bit length of each macroblock is different from one another, and thus, a process of reflecting each macroblock length into the symbols(f_mb(S) and b_mb(S)) is required. The present invention presents a method of carrying out this process simply.

4) Different from a first part of a data-partitioned VP, which is divided from a second part header by a DC_MARKER or a MOTION_MARKER, a second part header is connected to a second part texture with no division. Besides, a second part header is composed of general VLCs with which errors are not easily detected compared with RVLC, and thus errors are more possibly not detected.

Consequently, if errors in a second part header are not detected and decoding is carried out without noticing them, the video quality can be degraded. For example, in case that a DC coefficient error contained in a second part header of a P-VOP is not detected, the corresponding block may display a definitely different color from the surroundings.

5) It is very simple and easy just to substitute the macroblock to be error-concealed with a previous frame data for error concealment in a VP.

However, since a previous frame data is largely different from current frame data in a moving picture containing fast motions and/or frequent scene changes, an error-occurred portion may largely discord with the surroundings and the error concealment may become unsuccessful. Besides, the discordant portion may give a successive influence to the following frames.

SUMMARY OF THE INVENTION

The present invention is proposed to solve the problems of the prior art mentioned above. It is therefore the object of the present invention to provide a method of constituting an MPEG-4 video decoder having a reasonable error resilience with low-price by appropriately using error resistant algorithms provided by MPEG-4 in transmission circumstances where bit errors can be added.

To achieve the object mentioned above, the present invention presents a method for decoding a bit stream of data-partitioned MPEG-4 video in an error-prone transmission environment characterized by comprising:

a first step of searching for a start code of the following VP/VOP in an inputted video bit stream;

a second step of decoding the following VP/VOP headers succeeding the VP/VOP start code;

a third step of checking the error existence in macroblock addresses(MBAs) using the MBAs of current VP and the following VP;

a fourth step of scanning a VP whose MBA range is determined through the first, the second and the third steps for error-detection; and a fifth step of carrying out a normal decoding or an error concealment on each macroblock of current VP according to the VP scan result.

BRIEF DESCRIPTION OF THE DRAWINGS

FIG. 12 is a chart for explaining the error concealment methods for various cases in accordance with the present invention.

FIG. 13 is a chart for explaining the method of setting macroblock headers and other control variables for each error concealment method in accordance with the present invention.

DETAILED DESCRIPTION OF THE EMBODIMENTS

Hereinafter, referring to appended drawings, the structure and the operation procedures of an embodiment of the present invention are described in detail.

Figure 1:
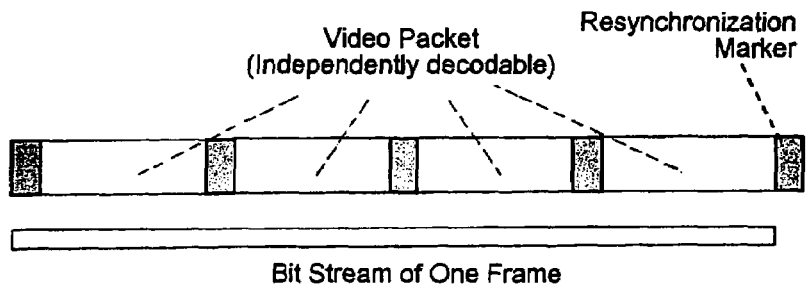
FIG. 1~FIG. 3 are views illustrating resynchronization marker, data-partitioning and reversible variable length encoding, respectively, of error resistant tools provided by an MPEG-4 of the prior art.
Figure 2:
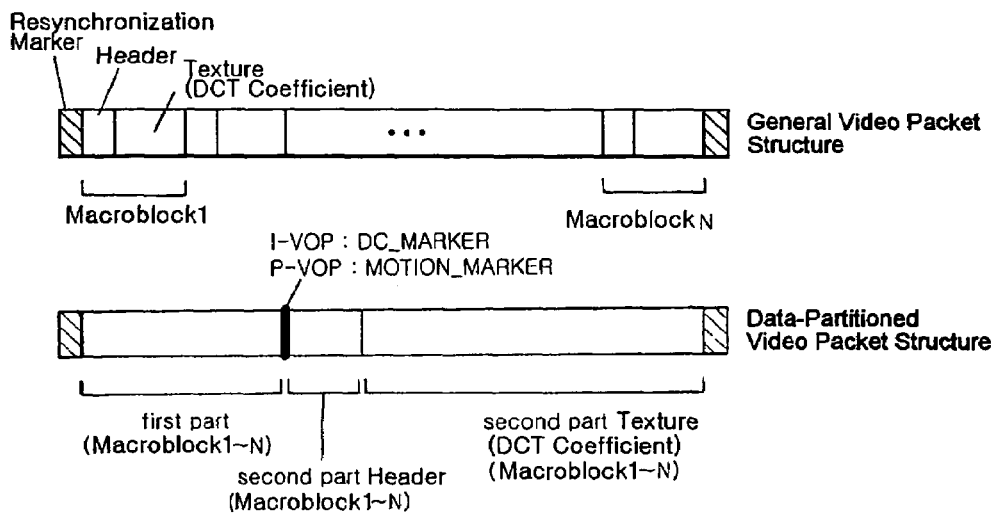
Figure 3:
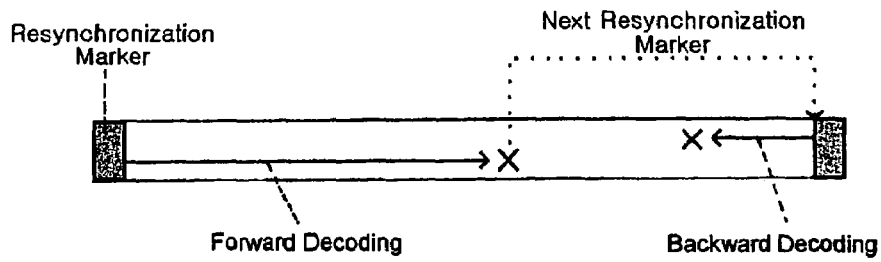
Figure 4:
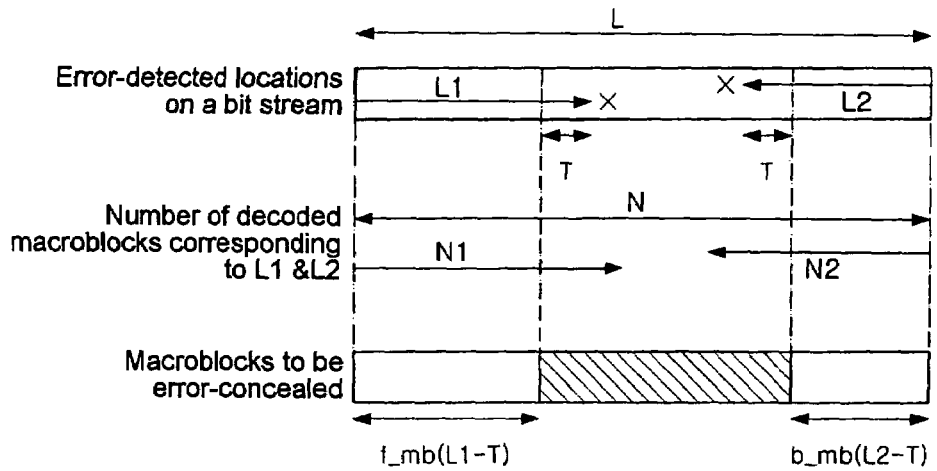
FIG. 4~FIG. 7 are views illustrating the prior decoding strategies of reversible variable length code(RVLC) respectively.
Figure 5:
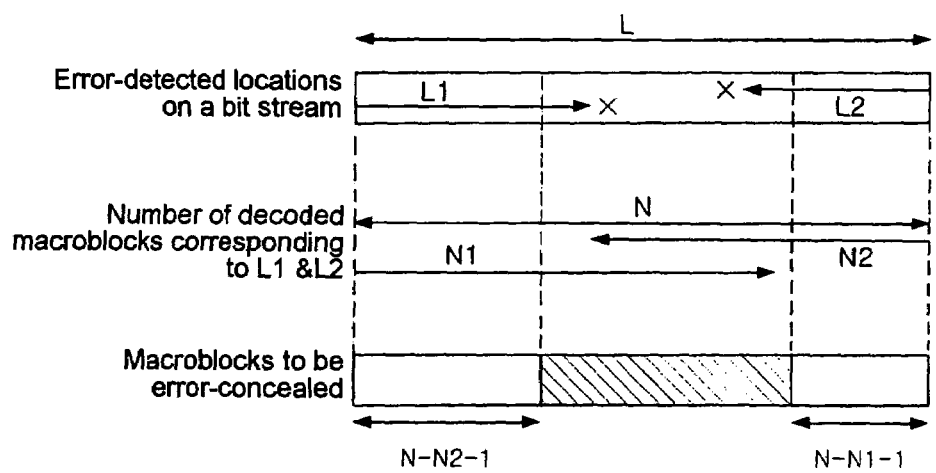
Figure 6:
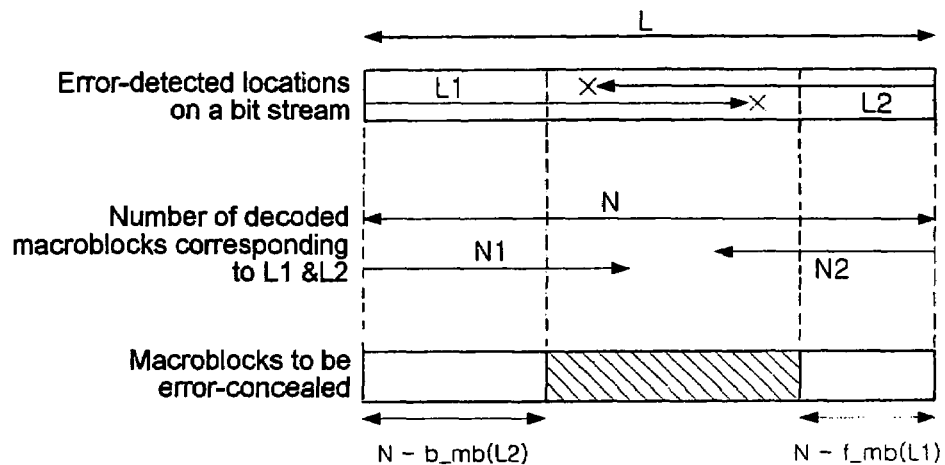
Figure 7:
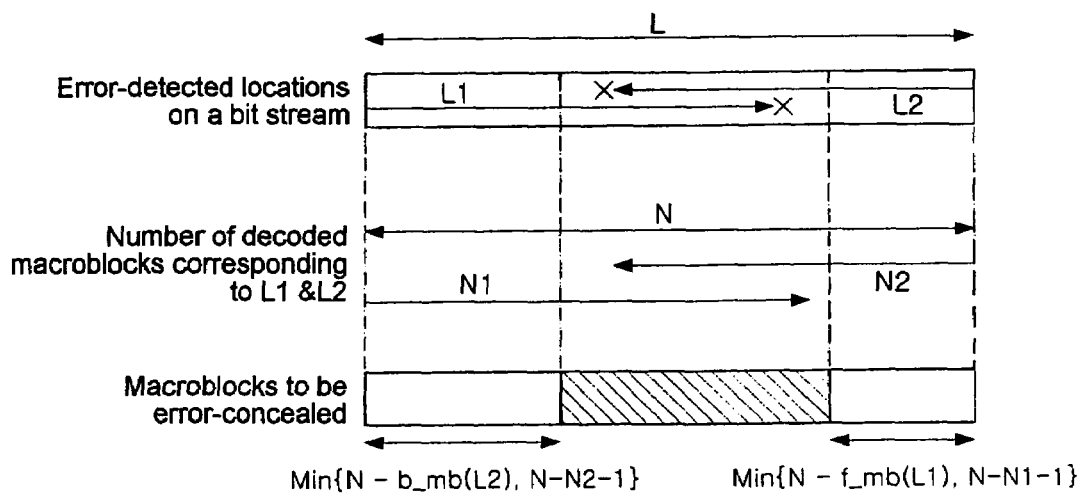
Figure 8:
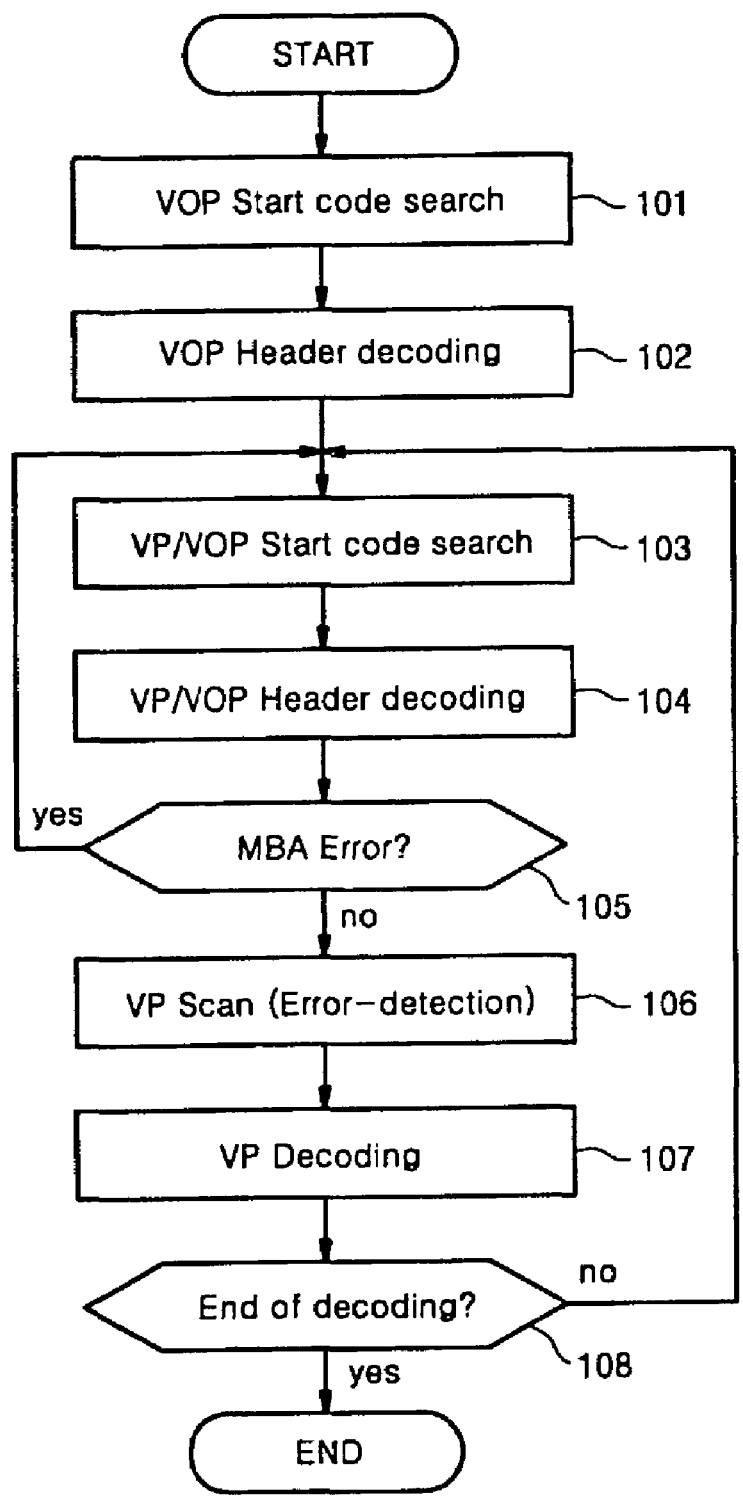
FIG. 8 is a flowchart showing the decoding procedures of a data-partitioned MPEG-4 video in an error-prone transmission environment in accordance with the present invention.

FIG. 8 is a flowchart showing the decoding procedures of a data-partitioned MPEG-4 video in an error-prone transmission environment in accordance with the present invention.

Looking into FIG. 8, in the step of VOP start code search(101), an inputted bit stream is decoded until a VOP start code, composed of 32 bits, appears. This decoding process before a VOP start code appears includes decoding of VOL(Video Object Layer) header, GOV(Group of VOP) header and so on. In the step of VOP header decoding(102), it decodes headers required for VOP decoding.

The step of VP/VOP start code search(103) is a process for searching for a start code of the following VP or VOP in an input bit stream, and it is carried out for finding the endpoint of VP to be currently decoded. Here, a VP start code means the same as a resynchronization marker. VP is classified into the following 4 kinds according to its way of being separated from another VP;

1) A VP whose start point is synchronized by a VOP start code and end point is also synchronized by a VOP start code: when a VOP is composed of one VP, the VP,
2) A VP whose start point is synchronized by a VP start code and end point is synchronized by a VOP start code: the last VP of a VOP,
3) A VP whose start point is synchronized by a VOP start code and end point is synchronized by a VP start code: the first VP of a VOP,
4) A VP whose start point is synchronized by a VP start code and end point is also synchronized by a VP start code: when a VOP is composed of more than three VPs, the VPs except the first and the last VP.

The 4 kinds of VP above described are handled together in FIG. 8 without any extra classification.

In the step of VP/VOP header decoding(104), it decodes the VP/VOP headers following the VP/VOP start code found in the step 103. If the next resynchronization is accomplished by a VP start code(or a resynchronization marker), a VP header is decoded, or else, i.e., if the next resynchronization is accomplished by a VOP start code, a VOP header is decoded. A VP header includes an MBA, a quantization coefficient, and so on.

The main object of this process is to obtain the MBA value of the following VP, and the MBA value is used for obtaining the number of macroblocks contained in current VP and checking for an MBA error. In case of a VOP header being decoded, the MBA value of the following VP is set to be a value greater than the maximum MBA value of VOP by 1(one).

In step 105, it checks the error existence in MBA with the values of MBA($MBA_k$) of current VP and MBA($MBA_{k+1}$) of the following VP.

$$MBA_k \geq MBA_{k+1}. \quad \text{[Equation 1]}$$

That is to say, if the result satisfies Equation 1, it is assumed that an error exists. It is because MBA should be continuously increased in a VOP. If an error occurrence in MBA of the following VP is detected by Equation 1, the number of macroblocks contained in the current VP can not be obtained, and thus it trashes the bit stream corresponding to current VP, moves to the step of VP/VOP start code search(103) to find the following VP/VOP start code, and then obtains the value of MBA($MBA_{k+2}$) of the following VP.

Then, if the result shows that $MBA_{k+1} < MBA_{k+2}$, the following VP is judged to have no error and it sets current VP to include macroblocks from $MBA_k$ to $MBA_{k+2}-1$, and then proceeds to the step of VP scan(106).

Here, the reason of using $MBA_k$ and $MBA_{k+2}$ instead of using $MBA_{k+1}$ is that $MBA_k$ and $MBA_{k+2}$ are considered to have less probability of containing errors than $MBA_{k+1}$. Of course, it could happen that $MBA_{k+1} \geq MBA_{k+2}$, which means that MBA errors occurred consecutively, however in an actual case, MBA takes a very small portion in total bit stream, and thus its error occurring probability is considerably low. Consequently, the probability of a consecutive error occurrence is extremely low. Nevertheless, if MBA errors occur consecutively, it follows a general rule as follows:

"When an MBA of $VP_k$ is represented by $MBA_k$ and an MBA of $VP_{k+1}$ is represented by $MBA_{k+1}$ and Equation 1 is being satisfied, it finds a $VP_{k+n}(n \geq 2)$ which satisfies $MBA_k < MBA_{k+n}$, constructs the current VP with macroblocks from $MBA_k$, the macroblock number of current VP, to $MBA_{k+n}-1$, and proceeds to the step of VP scan(106)."

In the step of VP scan(106), it checks the error existence in a VP whose range of macroblock numbers is determined through step 101~step 105 in FIG. 8. VP scan(106) comprises decoding of a first part, decoding of a second part header and scanning of a second part texture. Here, "scanning" a texture means a process of checking whether the input bit stream is listed on VLC or RVLC table and more than 64 DCT coefficients are decoded in a block.

In other words, scanning a texture can be regarded as decoding a VLC or an RVLC only, and other processes such as AC/DC coefficient prediction, inverse discrete cosine transform(IDCT), and motion compensation are not included.

By carrying out a process of VP scan before decoding VP macroblocks instead of decoding them instantly, the second problem, (2), of the prior art is solved. But, in the viewpoint of decoding time, the method proposed in the present invention is effective when the proportion of performing a VP scan on a VP without an actual error is not relatively high due to a frequently occurring macroblock error.

The reason why the present invention proposes a scanning process being carried out before decoding a texture is because MPEG-4 can be used in a wireless terminal, and thus it is important to reduce power consumption of an MPEG-4 bit stream decoder. A texture scan can be easily carried out by operating only a part of VLC decoder or an RVLC decoder without requiring an external memory access, and thus it consumes much less power than a texture decoding.

In the step of VP decoding(107), it carries out a normal decoding or an error concealment mode operation on each macroblock of current VP according to the VP scan(106) result.

In the step of decoding end decision(108), it finishes decoding of an MPEG-4 video bit stream when it receives a signal of no more bit stream to be decoded. Otherwise, it moves back to the step of VP/VOP start code search(103).

Figure 9:
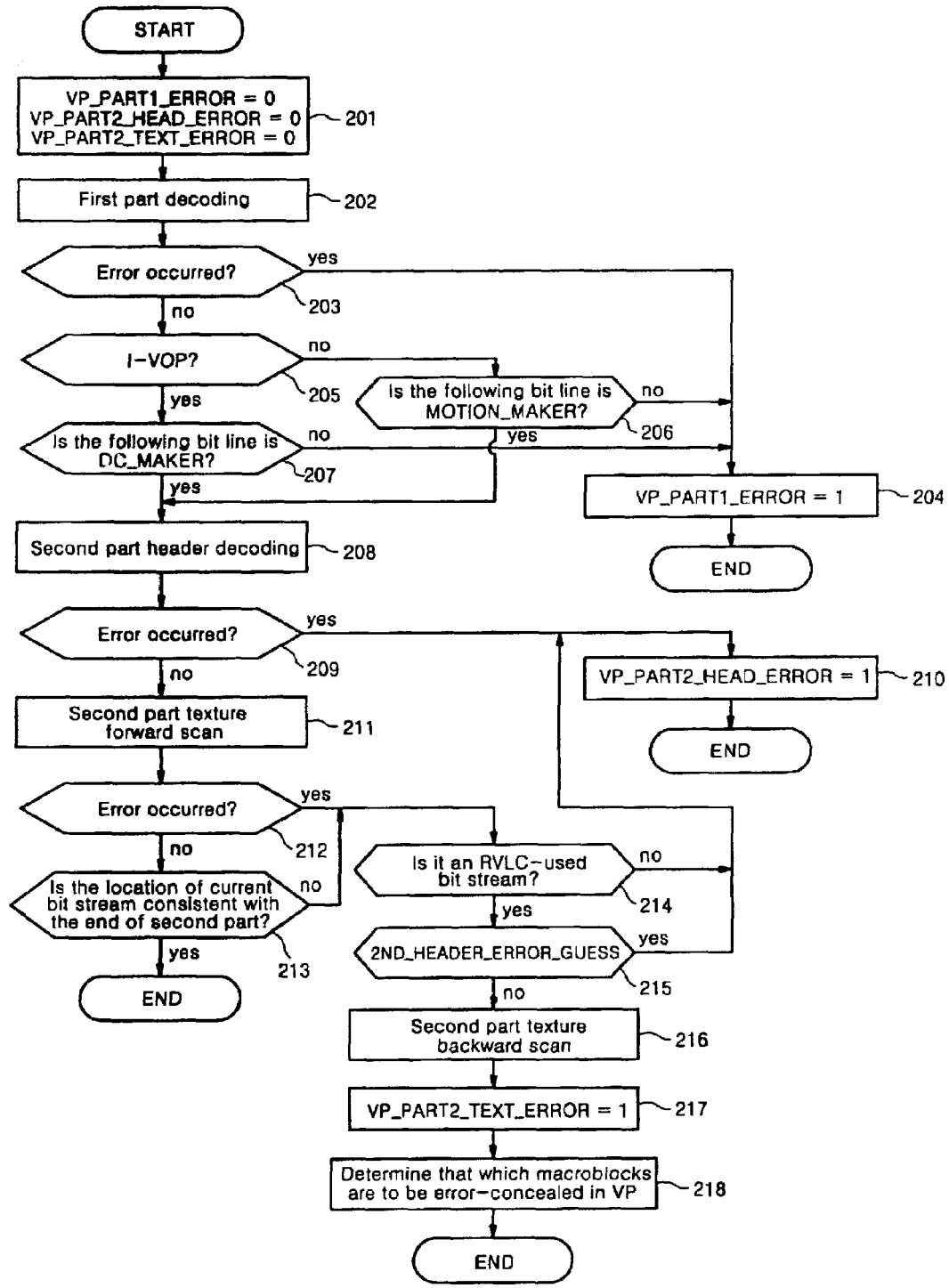
FIG. 9 is a flowchart showing the detail procedures of a VP scan described in FIG. 8.

FIG. 9 is a flowchart showing the detail procedures of VP scan(106).

Looking into FIG. 9, VP_PART1_ERROR, VP_PART2_HEAD_ERROR and VP_PART2_TEXT_ERROR are initialized to be 0(zero) at step 201.

These three variables indicate error existence in a first part, a second part header and a second part texture respectively, and '0' means no error. These values are used for decoding or error-concealing macroblocks in a VP.

In the step of first part decoding(202), it decodes the first part. In the decoding, different types of macroblock headers are included, depending on whether the frame type is I-VOP or P-VOP. In step 202, it decodes the first parts of MB_IN_VP macroblocks, and during the process, if a bit stream not listed on VLC table is inputted, it determines that an error is occurred and moves to step 203. By decoding the first parts of MB_IN_VP macroblocks in step 202, the first problem, (1), of the prior art is solved. This also helps to reduce the power consumption of a decoding system.

In step 203, it checks the error existence. If an error is detected in step 202, it moves to step 204 and sets the value of VP_PART1_ERROR to be 1(one), or else it moves to step 205. In step 205, it checks that the current VOP is an I-VOP or a P-VOP. If it is a P-VOP, it moves to step 206, or if it is an I-VOP, it moves to step 207.

In step 206, if the following 17 bits to be read is not a MOTION_MARKER, it determines that an error is occurred in the step of first part decoding(202) and moves to step 204. Similarly in step 207, if the following 19 bits to be read is not a DC_MARKER, it determines that an error is occurred in the step of first part decoding(202) and moves to step 204.

Such a method of decoding a first part of MB_IN_VP macroblocks and thereafter checking that the following bit stream is a DC_MARKER or a MOTION_MARKER can increase the error detection efficiency in a first part. The reason is as follows:

"VLCs used in a first part such as mcbpc, cbpy and mvd generally hardly have unused entries on their table, and thus even when an error-containing bit stream is inputted, it is more probably recognized as another entry instead of being treated as an error. However, in case that it is recognized as another entry on the table, the length of the corresponding VLC becomes incorrect in comparably many occasions."

Therefore, the process of decoding a first part up to a certain number of macroblocks, which are considered to have no error, and thereafter checking that the following is a specific bit pattern (here, a DC_MARKER or a MOTION_ MARKER) can provide an effective method for increasing the error detection efficiency in a first part.

If no error is detected in step 206 and step 207, a second part header decoding(208) is carried out. In a second part header, different types of macroblock headers are included, depending on whether the frame type is I-VOP or P-VOP.

In step 208, it decodes a second part header of MB_IN_VP macroblocks, and during the process, if a bit stream, which is not listed on VLC table according to the type of macroblock header, is inputted, it determines that an error is occurred and moves to step 209. In step 209, it checks the error existence. If an error is detected in step 208, it moves to step 210 and sets the value of VP_PART2_HEAD_ERROR to be 1(one), otherwise it moves to step 211.

In the step of second part texture forward scan(211), it carries out the following processes on an inputted second part texture bit stream;

1) It checks an inputted bit stream in sequence whether it is listed on a VLC or an RVLC table. If a bit stream not listed on the table is inputted, it determines that an error is occurred.
2) It checks whether more than 64 DCT coefficients are decoded in a block. If so (i.e., more than 64 DCT coefficients are decoded), it determines that an error is occurred.
3) Whenever starting a texture scan on a new macroblock, it stores the distance in bit unit between the starting location of the macroblock and the starting location of the second part texture of current VP into $MBSP_k$. Here, k is a serial number of a macroblock in VP. In forward scan, k increases by 1 from 0 for each macroblock. This information is used for carrying out RVLC decoding strategies.
4) It stores the number of completely scanned macroblocks into RVLD_N1.
5) It stores the distance in bit unit between the ending location of forward scan and the starting location of the second part texture on the bit stream into FSCAN_END-POS. If there is no actual error, the location will be consistent with the endpoint of the second part.

Different from texture decoding that produces a decoded video, texture scan includes only an error checking process of a VLC or an RVLC. Thus, once a bit stream of a texture is read by an internal memory, it can be processed quickly without requiring another internal/external memory access.

In step 212, it checks for an error occurrence in the step of second part texture forward scan(211). If an error is occurred in step 211, it moves to step 214, otherwise it moves to step 213.

In step 213, it checks whether the current bit stream location is consistent with the end of the second part. In case that there is no error in a second part texture, the current bit stream location should be consistent with the end of the second part, but, if an error exists, they generally does not match with each other. In this step(213), if the current bit stream location is consistent with the end of the second part, it ends the VP scan(106). This results in that there is no error on overall VP.

In step 214, it checks whether an RVLC is used in a second part texture based on VOL header decoding result. If an RVLC is used, it moves to step 215, otherwise it moves to step 210 and sets the value of VP_PART2_HEAD_ERROR to be 1(one).

Here, the reason for moving to step 210 is because, in case of an error being occurred in a bit stream using a VLC as a texture, the actual error occurring location is hard to be detected and in addition, it could be the case of a second part header error being detected later.

In step 215, if the value of 2ND_HEAD_ERROR_GUESS is 'true', it moves to step 210, and if the value is 'false', it moves to step 216. 2ND_HEAD_ERROR_GUESS is defined as follows:

$$FSCAN\_ENDPOS < T. \qquad \text{[Equation 2]}$$

Here, T is the value set by MPEG-4 annex E and the value is 90. Thus, if the value of 2ND_HEAD_ERROR_GUESS is 'true', which means that a forward texture scan error is occurred within the first T bits, and it is regarded that a second part header error spreads to texture to be detected there. This solves most of the fourth problem of the prior art. Here, "most" means that, even when a second part header error is not detected and overflows to texture, the error may not be detected within T bits.

The second part headers are ac_pred_flag and cbpy for an I-VOP and ac_pred_flag, cbpy, dquant, and DC for a P-VOP. Among these, ac_pred_flag is not error-detectable and a VLC table used for cbpy and DC is structurally less probable for an error-containing bit stream to be detected.

Besides, different from that a MARKER is placed between a first part and a second part header, there is nothing between a second part header and a second part texture. However, since header information gives more influence to image quality than texture information, if one carries out a texture decoding without being aware of a second part header error, for example if using a wrong DC value, the decoded video gets to contain a notable abnormality.

In particular, if this abnormality is transferred to the subsequent frames, it causes a notable degradation of image quality. This kind of problem can be somewhat solved by using an RVLD. That is to say, if a second part header error is occurred, the second part header is probably ended at a different location from that without an error. Therefore a second part texture initially starts with an error due to a second part header error, and in case of using an RVLD, the error will be detected in the early part of a second part texture. Here, the cut-line of the early part is chosen to be T.

In the step of second part texture backward scan(216), it carries out the following processes on an inputted second part texture bit stream. These processes are being carried out only when an RVLC is used therein;

1) It checks the inputted bit stream reversely from the end of a second part whether it is listed on an RVLC table. If a bit stream not listed on the table is inputted, it determines that an error is occurred.
2) It checks whether more than 64 DCT coefficients are decoded in a block. If so, it determines that an error is occurred.
3) Whenever finishing a texture scan on a new macroblock, it stores the distance in bit unit between the starting location of the macroblock and the starting location of the second part texture on the bit stream into $MBSP_k$. Here, k is a serial number of a macroblock in VP. In backward scan, k decreases by 1 from MB_IN_VP-1 for each macroblock. This information is used for carrying out RVLC decoding strategies.
4) It stores the number of completely scanned macroblocks into RVLD_N2.
5) It stores the distance in bit unit between the ending location of backward scan and the starting location of the second part texture on the bit stream into BSCAN_END-POS. If there is no actual error, the location will be consistent with the starting point of the second part.

In step 217, it sets the value of VP_PART2_TEXT_ERROR to be 1 to store the fact that the second part texture contains an error. In step 218, it determines that which macroblock is to be error-concealed in a VP. In other words, it localizes the error in a VP by macroblock unit.

Figure 10:
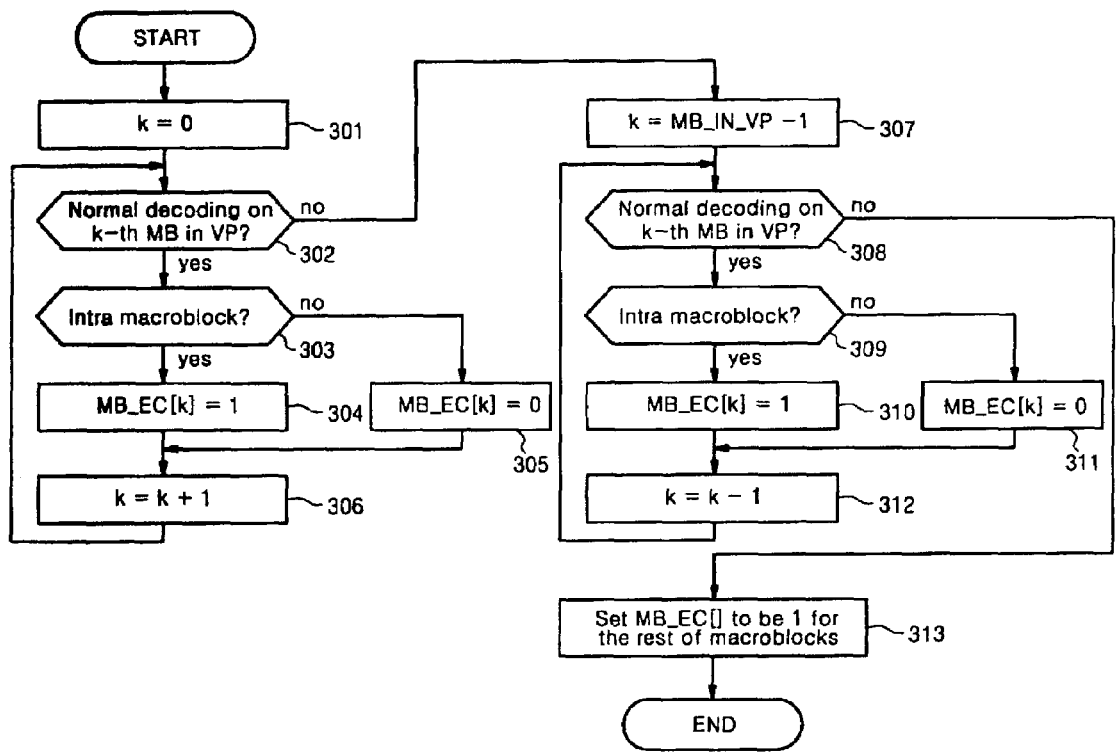
FIG. 10 is a flowchart showing the detail procedures for determining which macroblock is to be error-concealed in a VP described in FIG. 9.

FIG. 10 is a flowchart showing the detail procedures for determining that which macroblock is to be error-concealed in a VP(step 218).

Looking into FIG. 10, in step 301, it initializes the value of k to be 0(zero, which represents a serial number of macroblock in a VP. In step 302, it decides whether the k-th macroblock in a VP can be normally decoded. The equation used for the decision in step 302 is as follows:

$(MBSP_k<\text{Min}\{FSCAN\_ENDPOS-T, BSCAN\_END-POS\})$ and $(k<(MB\_IN\_VP-RVLD\_N2-1))$. [Equation 3]

Here, Min{ } represents the minimum value among the variables in { }, and "and" represents a logical AND.

In step 302, if Equation 3 is "true", which means that the k-th macroblock in a VP is decodable, it moves to step 303.

In steps 303~305, in case that the k-th macroblock in a VP is an intra macroblock, it compulsorily sets the value of MB_EC[k] to be 1(one) for error concealment.

Then, it increases the value of k by 1 in step 306 and moves to step 302 to determine the following macroblock to be normally decoded or not. If the macroblock is determined to be error-concealed in step 302, it moves to step 307.

Steps of 307~312 are the analogy of steps 301~306 with backward scanning. That is to say, in steps 307~312, it determines whether the macroblock is normally decodable and an intra in reverse order from the end of the texture and stores the MB_EC[ ] value. The equation used for the decision in step 308 is as follows:

$(MBSP_k>\text{Max}\{BSCAN\_ENDPOS+T, FSCAN\_END-POS\})$ and $(k>RVLD\_N1)$ [Equation 4]

Here, Max{ } represents the maximum value among the variables in { }, and "and" represents a logical AND.

If the k-th macroblock in a VP is determined to be error-concealed in step 308, it moves to step 313. In step 313, it sets the value of MB_EC[ ] to be 1 for each macroblock whose MB_EC[ ] value is not set through the steps of 301~312 for error concealment.

Equations 3 & 4 cover overall RVLC decoding strategies described in FIGS. 4~7. With these equations, it can be simply determined that the k-th macroblock in a VP is forward-decodable or backward-decodable by using the bit stream locations stored in VP scan process(106) such as $MBSP_k$, FSCAN_ENDPOS, and BSCAN_ENDPOS, and the numbers of macroblocks, RVLD_N1 and RVLD_N2. This solves the third problem, (3), of the prior art.

Figure 11:
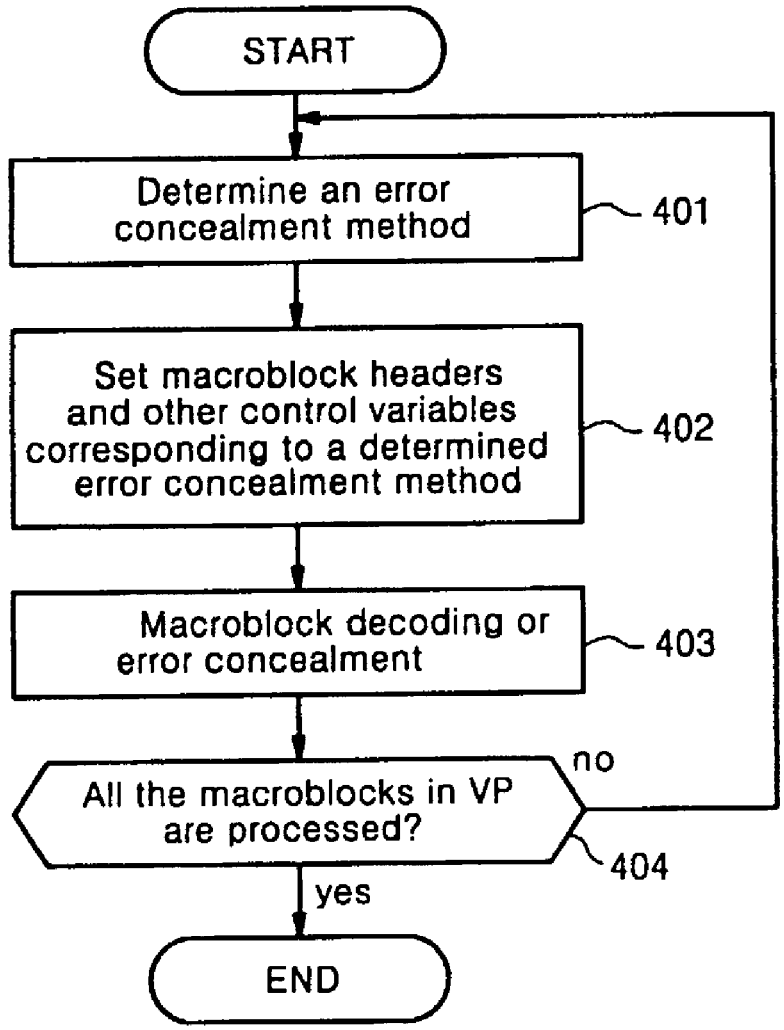
FIG. 11 is a flowchart showing the detail procedures of VP decoding described in FIG. 8.

FIG. 11 is a flowchart showing the detail procedures of VP decoding(107).

Looking into FIG. 11, it determines error concealment methods for various cases in the step of error concealment method determination(401) based on FIG. 12.

In step 402, it sets macroblock headers and other control variables, based on FIG. 13, according to an error concealment method determined in step 401. Here, the reason for setting macroblock headers is because some headers are possibly damaged by the error.

In step 403, it carries out macroblock decoding or error concealment according to the macroblock headers and other control variables set in step 402. In step 404, it checks whether the processes of steps 401~403 are carried out for all the macroblocks in a VP.

FIG. 12 is a chart for explaining the error concealment methods for various cases. The cases are largely classified into SR0~SR3, and the definitions and meanings of the cases are described in Table 1. Referring to Table 1, the error ratio in VP increases from SR0 to SR3.

TABLE 1

| Name | Definition | Meaning |
|------|------------|---------|
| SR0 | VP_PART1_ERROR = 0, VP_PART2_HEAD_ERROR = 0, VP_PART2_TEXT_ERROR = 0 | No error in VP |
| SR1 | VP_PART2_TEXT_ERROR = 1 | Second part texture error |
| SR2 | VP_PART2_HEAD_ERROR = 1 | Overall second part error |
| SR3 | VP_PART1_ERROR= 1 | First part error and overall second part error |

Here, VP_PART1_ERROR indicates an error existence in a first part and '0' means no error. VP_PART2_HEAD_ERROR indicates an error existence in a second part header and '0' means no error. VP_PART2_TEXT_ERROR indicates an error existence in a second part texture and '0' means no error.

EC is the value of MB_EC[ ] corresponding to current macroblock in VP. If the value is '1', the current macroblock is error-concealed, and if it's '0', the current macroblock is normally decoded. An intra MB is a macroblock having no relation with the previous frame, and on the contrary, an inter MB is a macroblock encoded by motion compensation from the previous frame.

UIDV is an abbreviation of use_intra_dc_vlc, and it indicates whether DC of an intra MB is encoded by a special method. This value can be different for each macroblock, and it gives an influence to the location of a DC coefficient of an intra MB in VP. In other words, if the value is '1', a DC coefficient of an intra MB in an I-VOP appears in the first part and a DC coefficient of an intra MB in a P-VOP appears in the second part header. On the contrary, if the value is '0', a DC coefficient of a macroblock is contained in the second part texture.

$DCA_x$(DC Availability) indicates the availability of DC coefficients of the blocks included in the upper adjacent macroblock to the x-th macroblock in horizontal direction. '1' indicates 'available' and '0' indicates 'not available'. If the number of macroblocks in horizontal direction in a VOP is MBC, x(in $DCA_x$) can have a value from 0 to MBC-1.

For example, $DCA_0$~$DCA_{10}$ can exist in a QCIF-size image. When a VOP decoding is started, the values of $DCA_x$(x=0,1, . . . ,MBC-1) are initialized to be 0(zero . By this initialization, the uppermost macroblocks in a VOP can not use the DC coefficients of the blocks in an upper adjacent macroblock. The method for setting $DCA_x$ values for each macroblock in VOP decoding is described in FIG. 13.

Referring to FIG. 12, it applies error concealment methods of A, B, C, D, E, or F to 18 different cases respectively. The meanings of A~F types of error concealment methods are described in Table 2.

TABLE 2

| Error concealment method | Meaning |
| --- | --- |
| A | Normal decoding without an error concealment |
| B | Decoding each block in a macroblock with using a DC coefficient of the upper adjacent block only |
| C | Substituting with the corresponding decoding result of the previous VOP at the same location |
| D | Decoding with using the DC coefficients provided by current macroblock only |
| E | Substituting with the decoding result of the previous VOP corresponding to the decoded motion vector |
| F | Substituting with the decoding result of the previous VOP corresponding to the motion vector of the upper adjacent block, in case of no upper adjacent block, the motion vector is regarded to be (0, 0) |

Procedures for determining an error concealment method in FIG. 12 have the following characteristics. These characteristics improve the fifth problem, (5), of the prior art:

1) It maximizes the usability of DC coefficients in an intra MB(#3~5, #8~12 and #15~16 in FIG. 12). An intra MB is a macroblock having less relation with the previous frame, and particularly an intra MB in a P-VOP is more probable to be the case that the macroblock of the previous VOP at the same location is notably different from the neighboring macroblocks of current VOP. Therefore, it is more effective to carry out an error concealment using DC coefficients in the same VOP than bringing the decoding result of the previous frame at the same location.

2) Even for an inter MB, if the upper adjacent MB is intra, it uses DC coefficients of the intra MB(#6, 13, 17 in FIG. 12). An intra MB in a P-VOP more probably shows big difference from the neighboring macroblocks of the previous VOP, and it often reflects a scene change. In that case, the neighboring macroblocks are probably being changed together rather than a single macroblock is being scenic-changed independently.

Therefore, if the upper adjacent macroblock is intra, it is more effective to use DC coefficients of the intra MB than to bring the decoding result of the previous VOP. Actually, in a simulation with this characteristic being applied, the image quality degradation over numbers of successive VOPs due to an improper concealment by different macroblock of the previous VOP is considerably decreased.

The reason for using the upper adjacent MB among the neighboring MBs is that; first, the left or right adjacent MB is contained in the same VP, so that it is more probable to have the same error, and second, for using the information of the lower adjacent MB, it has to wait until the lower MB is being decoded, and in addition, it also requires a memory to store some necessary information for the waiting period. On the contrary, the upper adjacent MB has relatively less probability of containing an error even when the current MB contains an error. In addition, since it has been already decoded, no additional delay time is required and the original memory for decoding process can be reused.

3) If a motion vector is lost and the upper adjacent MB is inter, it brings the decoding result of the previous VOP by using a motion vector of the upper adjacent block(#18 in FIG. 12). Since two macroblocks adjacent to each other upward/downward are more probably to have similar motions, it is more effective to use motion vectors of the upper adjacent blocks than to bring the decoding result of the previous frame at the same location. In case of no upper adjacent block, the motion vector is considered to be (0,0).

FIG. 13 shows the setting of macroblock headers and other control variables corresponding to each error concealment method, A~F.

Referring to FIG. 13, in case that an error concealment method is A, which means a normal decoding case, it does not carry out either motion vector concealment or DC coefficient concealment and sets the value of $DCA_x$ to be 1(one) only for an intra MB. That is to say, for an intra MB, it allows the lower adjacent macroblock to use its DC coefficients.

In case that an error concealment method is B, DC coefficients are set to be used only for current block decoding by setting not_coded=0, mb_type=3, cbp=0, and ac_pred_flag=0. And by setting a DC coefficient concealment indication value to be '1', it uses DC coefficient values of the upper adjacent block as those of current block. And then, $DCA_x$ is set to be '0'. In other words, once the DC coefficients of the upper adjacent block is used for current block, it does not allow the lower adjacent block to use DC coefficients of current block later on.

In case that an error concealment method is C, it sets not_coded=1 and does not carry out either motion vector concealment or DC coefficient concealment so that the motion vector is set to be (0,0). In other words, it brings the decoding result of a macroblock of the previous frame at the same location. $DCA_x$ is not changed.

In case that an error concealment method is D, it sets cbp=0 and ac_pred_flag=0. Since an error concealment method D is selected only for an intra MB, only DC coefficients are used for current block decoding. Since the DC coefficients, not affected by the error contained in the current block, are available, it does not carry out either motion vector concealment or DC coefficient concealment. $DCA_x$ is always set to be '1'. Since valid DC coefficients are produced in current block, it allows the lower adjacent block to use DC coefficients of current block regardless of the existing $DCA_x$ value.

In case that an error concealment method is E, it sets cbp=0 and ac_pred_flag=0. Since an error concealment method D is selected always for an inter MB, only motion vectors are used for current block decoding. Since the motion vectors, not affected by the error contained in the current block, are available, it does not carry out either motion vector concealment or DC coefficient concealment. $DCA_x$ is not changed.

In case that an error concealment method is F, it sets not_coded=1. And by setting the motion vector concealment indication value to be '1', it brings the decoding result of the previous VOP using a motion vector of the upper adjacent block. If there exists no upper adjacent block, it sets the motion vector to be (0,0) and brings the decoding result of the previous VOP. $DCA_x$ is not changed.

Figure 14:
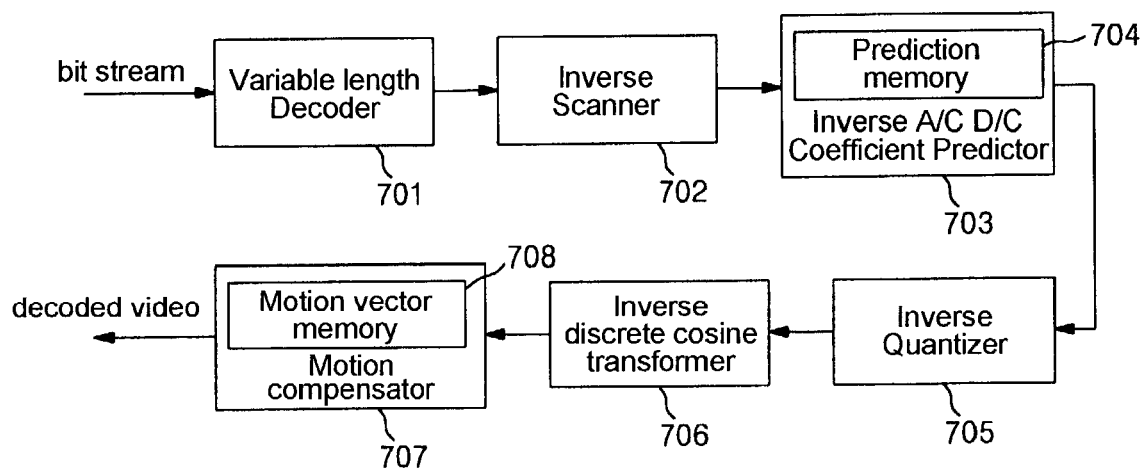
FIG. 14 is a block diagram illustrating an embodiment of an MPEG-4 video texture decoder to which the error concealment method is applied in accordance with the present invention.

FIG. 14 is a view illustrating an embodiment of an MPEG-4 video texture decoder being applied by the setting of macroblock headers and other control variables according to the error concealment methods described in FIG. 13.

Looking into FIG. 14, a variable length decoder(VLD; 701) decodes a variable length encoded bit stream and outputs AC/DC predicted discrete cosine transform(DCT) coefficients. An inverse scanner(702) carries out a zigzag scan, a horizontal scan or a vertical scan on the output of VLD(701) in block unit of 8×8 pixels according to the direction of AC/DC coefficient prediction and the existence of AC coefficient prediction.

An inverse AC/DC coefficient predictor(703) carries out an inverse process of AC/DC coefficient prediction performed by an encoder. MPEG-4 carries out an AC/DC coefficient prediction during the encoding process to increase the compression efficiency of a digital video.

A prediction memory(704) is a memory storing some portion of DC coefficients and AC coefficients corresponding to about a line of macroblock for carrying out an inverse AC/DC coefficient prediction. An inverse quantizer(705) carries out an inverse quantization and an inverse discrete cosine transformer(IDCT; 706) carries out an inverse discrete cosine transform to change the video data in frequency domain into that in spatial domain.

A motion compensator(MC; 707) summates the output of an IDCT(706) and the video data obtained by using a motion vector and/or the decoding result of the previous VOP to finally output a decoded image.

A motion vector memory(708) is a memory storing motion vectors corresponding to a line of macroblock for a motion compensator to obtain a motion vector prediction value. The processes through 701~708 should be carried out in block unit of at least 8×8 pixels.

For example, if an error concealment method B is to be applied to a certain macroblock, that is, if DC coefficients of the upper adjacent block is to be used for those of current block, it can simply use the DC coefficients of the upper adjacent block stored in a prediction memory(704) without installing an extra memory.

Additionally, if an error concealment method F is to be applied to a certain macroblock, that is, in case of bringing the decoding result of the previous VOP using a motion vector of the upper adjacent block, it can simply use the motion vector of the upper adjacent block stored in a motion vector memory(708) without installing an extra memory.

Here, in case of no existing upper adjacent block, it sets the motion vector to be (0,0) and brings the decoding result of the previous VOP.

Conclusively speaking, an MPEG-4 video texture decoder described in FIG. 14 does not include any extra circuit for error concealment, however, the present invention has presented appropriate error concealment methods by using the decoder.

Figure 15:
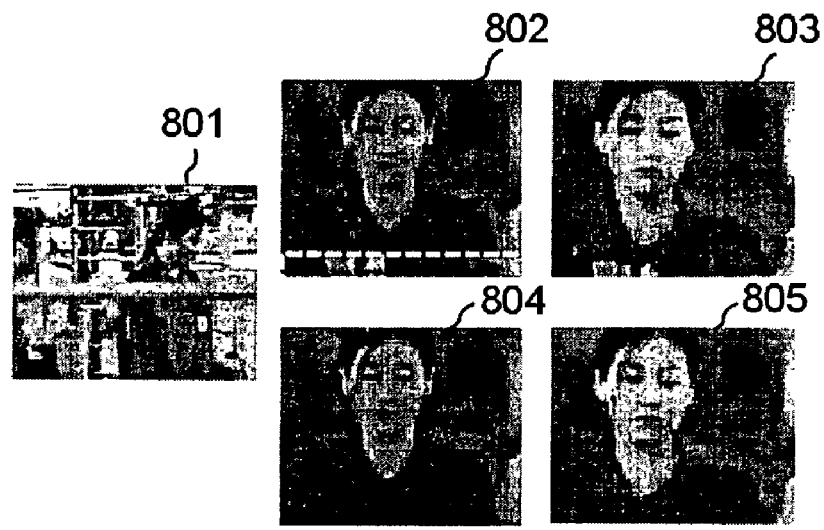
FIG. 15 and FIG. 16 are views illustrating the embodiments showing the error concealment performance improvement in accordance with the present invention.
Figure 16:
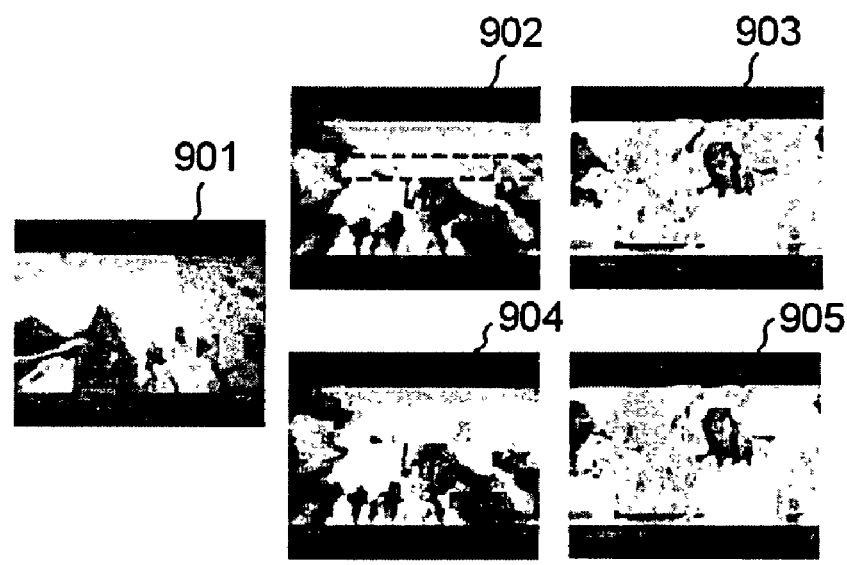

FIG. 15 and FIG. 16 are views illustrating the embodiments showing the error concealment performance improvement in accordance with the present invention.

In FIG. 15, when 801 is N-th VOP, 802 and 803 are N+1-th and N+9-th VOPs respectively with a prior decoding method is being applied thereto. On the other hand, 804 and 805 are N+1-th and N+9-th VOPs respectively with an error concealment method presented in the present invention is being applied thereto. These VOPs are QCIF-sized and encoded with a quantization coefficient of 30. An error environment of a bit error rate of $10^{-3}$ and a Doppler frequency of 5 Hz is applied thereto. The area surrounded by dotted line in 802 represents an error-occurred portion of the VOP.

Macroblocks inside the dotted line contains both intra MBs and inter MBs. On the contrary that the area surrounded by dotted line in 802 is directly brought from the previous VOP 801, the same area in 804 is error-concealed by DC coefficients of the upper adjacent block with an error concealment method B being applied thereto. 804 looks like containing almost no error. 803 shows the bad effect on the following VOPs due to an improper error concealment of 802. Even after 8 VOPs being passed through, the trace of an improper error concealment of 802 still remains in 803. On the contrary, no trace of error concealment can be found in 805.

901~905 in FIG. 16 are structurally similar to 801~805 in FIG. 15, and thus an explanation on FIG. 16 will be omitted.

A method for decoding of MPEG-4 digital video in accordance with the present invention has been described in detail. Hereinafter, the meaning of each variable appeared in the specification of the present invention will be briefly explained in an alphabetical order for better understanding on the specification:

ac_pred_flag: One of the macroblock headers. One(1) bit information indicating whether AC coefficient prediction is being performed in a macroblock. If its value is '1', AC coefficient values can be varied after inverse AC/DC coefficient prediction.

cbpy: One of the macroblock headers. A variable length code for containing the coding information of luminance block.

DC_MARKER: A specific bit pattern (17 bits) dividing a first part and a second part in an I-VOP.

DCT: Discrete Cosine Transform.

first part: the part before DC_MARKER or MOTION_MARKER in a data partitioned VP.

GOV: Group of VOP. A header possibly coming out once in every specific number of VOPs. It includes timing information.

I-VOP: A VOP only using its own information with no relation to previous VOP.

intra MB: A macroblock unrelated to previous frame.

inter MB: A macroblock encoded through motion compensation from previous frame.

MB: Macroblock.

MBA: Macroblock address. A serial number of macroblock, numbered by the direction from the top-left to right on a frame. In case of a QCIF image, it takes the value of 0~98.

MBC: Number of horizontal macroblocks contained in a VOP.

mcbpc: One of the macroblock headers. A variable length code for containing the macroblock type and the coding information of chrominance block.

mvd: One of the macroblock headers. A variable length code for containing the difference value of a motion vector.

MOTION_MARKER: A specific bit pattern (19 bits) dividing a first part and a second part in a P-VOP.

P-VOP: A VOP using a motion compensation from previous VOP.

QCIF: A image size having 176 horizontal pixels and 144 vertical pixels.

RVLD: A reversible variable length decoder.

second part the part after DC_MARKER or MOTION_MARKER in a data partitioned VP.

UIDV An abbreviation of use_intra_dc_vlc. It indicates whether DC of an intra MB is encoded with a special standard.

VLC: A variable length code.

VOL: A video object layer. It means a moving picture composed of a series of VOPs.

VOP: A video object plane. It has the same meaning as frame.

VP: A video packet. A resynchronization unit divided by a resynchronization marker or a VOP start code.

The followings are explanations on variables mainly used in the present invention(alphabetical order):

2ND_HEAD_ERROR_GUESS: It is set to be '1' for the case that, during a scan on an RVLC-used VP, no error is detected in the first part and in the second part header but an error is detected within the first T bits of the second part texture. Otherwise, it is set to be '0'. This value can be used for guessing a second part header error which is comparably difficult to detect by the location of a second part texture error.

BSCAN_ENDPOS: The location where a backward scan on an RVLC-used second part texture is ended. It is bit length from the start of a second part texture start.

DCA: DC availability. A variable indicating whether DC values of the upper adjacent block are available. It contains the same number of information as that of horizontal macroblocks of a VOP.

FSCAN_ENDPOS: The location where a forward scan on an RVLC-used second part texture is ended. It is bit length from the start of a second part texture start.

MB_EC[k]: It indicates whether the k-th macroblock of a VP is to be error-concealed. '1' means to be error-concealed.

MB_IN_VP: Number of macroblocks contained in a VP. It is obtained by (MBA of the following VP)-(MBA of the current VP).

$MBSP_k$: Starting location of k-th macroblock of a VP on a bit stream. It is bit length from the start of a second part texture.

RVLD_N1: Number of completely scanned macroblocks when a forward scan on an RVLC-used second part texture is ended.

RVLD_N2: Number of completely scanned macroblocks when a backward scan on an RVLC-used second part texture is ended.

As mentioned thereinbefore, a method for decoding of MPEG-4 digital video in accordance with the present invention has the following advantages:

First, since it checks, when decoding the current VP, the MBA of the following VP to obtain the number of macroblocks contained in current VP before decoding the first part of current VP, it eliminates the case of decoding more bit stream than the necessary bit stream due to not detecting the error, when decoding a first part containing an error, and thus it reduces the decoding time.

In addition, according to the method of the present invention, an error can be detected by simply checking whether the following bit pattern is a DC_MARKER or a MOTION_MARKER after decoding a first part up to a predetermined number of macroblocks. And thus, it improves the error detection efficiency and reduces the decoding time compared with the prior art that keeps decoding until an error is detected.

Second, by carrying out a scanning process, which only checks the error existence on an input bit stream, before decoding a second part texture, which takes the most important role in a VP, it eliminates the case of trashing a decoded result during a decoding of an error-containing VP. Therefore, it reduces the decoding time in transmission environments having a high error rate.

Besides, texture decoding generally requires more memory access than texture scan and consequently consumes a lot more power. By carrying out texture scan in advance to texture decoding, the power consumption is reduced.

Third, the above described equations 3 & 4 cover overall RVLC decoding strategies described in FIGS. 4~7. With these equations, it can be simply determined that the k-th macroblock in a VP is forward-decodable or backward-decodable by using the bit stream locations stored in VP scan process(106) such as $MBSP_k$, FSCAN_ENDPOS, and BSCAN_ENDPOS, and the numbers of macroblocks, RVLD_N1 and RVLD_N2. This solves the third problem, (3), of the prior art and makes it possible to construct an MPEG-4 decoder more simply.

Fourth, it carries out a forward scan on an RVLC-used second part texture, and in case of an error being detected within a certain range from the starting point, regards it to be a second part header error. And thus, it solves most of the problems of image quality degradation possibly being caused by the difficulty of a second part header error detection. Stochastically, however, even in the case of an error being exist in a second part header, it may not be detected within a certain range from the starting point of the second part texture.

Fifth, in case of an error being detected when carrying out a forward scan on a VLC-used second part texture, it regards that an error is also occurred in a second part header regardless of the error-occurring location. And thus, it solves most of the problems of image quality degradation possibly being caused by the difficulty of a second part header error detection.

Sixth, by applying various error concealment methods to error-occurred macroblocks according to the types of errors, it solves the problems caused by unconditionally bringing the decoding result of the previous VOP at the same location. Embodiments of the present invention illustrating this effect are described in FIG. 15 and FIG. 16.

Seventh, with the characteristics described above, a decoding method in accordance with the present invention can afford a reasonable error resilience by introducing simple error detection and concealment methods. In particular, the error concealment methods mentioned in the sixth advantageous characteristic do not require an additional operation and share memories for error concealment with those for decoding. Therefore, it can provide a higher error resilience with comparably low hardware complexity.

Since those having ordinary knowledge and skill in the art of the present invention will recognize additional modifications and applications within the scope thereof, the present invention is not limited to the embodiments and drawings described above.

What is claimed is:

1. A method for decoding of video for decoding a bit stream of data-partitioned video in an error-prone transmission environment characterized by comprising:
    a first step of searching for a start code of the following VP/VOP in an inputted video bit stream;
    a second step of decoding the following VP/VOP headers succeeding said searched VP/VOP start code;
    a third step of checking the error existence macroblock addresses (MBAs) using the MBAs of the current VP and the following VP;
    a fourth step of scanning a VP, whose MBA range is determined through said first, second and third steps, for error-detection; and
    a fifth step of carrying out a normal decoding or an error concealment on each macroblock of current VP according to the result of said VP scanning,
    wherein said fourth step further comprises the steps of:
    (a) decoding a first part and checking for an error existence;
    (b) decoding a second part header and checking for an error existence; and
    (c) scanning on a second part texture and checking for an error existence,
    wherein said (c) step further comprises the steps of:
    (c1) carries out a forward scan on said second part texture;
    (c2) in case of no error occurred in said (c1) step, comparing the location where said forward scan is ended and the location of the end of said second part texture, and if they are consistent with each other, ending the VP scan;
    (c3) in case of no RVLC is used in said second part texture, determining that an error is occurred in said second part header and ending the VP scan;
    (c4) in case that said location where said forward scan is ended is located within a certain range from the starting location of said second part texture, determining that an error is occurred in said second part header and ending the VP scan, and otherwise, carries out a backward scan on said second part texture; and
    (c5) setting that an error is occurred in said second part texture and determining which macroblocks are to be error-concealed in said VP.

2. A method for decoding of video as claimed in claim 1, wherein said (c5) step further comprises the steps of:
    (c5-1) determining the range of macroblocks to be normally decoded from the starting location of said second part texture by using the following Equation 6;

$(MBSP_k < Min\{FSCAN\_ENDPOS-T, BSCAN\_END-POS\}]$ and $(k<(MB\_IN\_VP-RVLD\_N2-1))$ [Equation 6]

(c5-2) determining the range of macroblocks to be normally decoded from the ending location of said second part texture by using the following Equation 7;

$(MBSP_k < Max\{BSCAN\_ENDPOS+T, FSCAN\_END-POS\})$ and $(k<RVLD\_N1)$, and [Equation 7]

(c5-3) setting the rest of macroblocks, which are not to be normally decoded, to be error-concealed.

3. A method for decoding of video as claimed in claim 1, wherein said fifth step further comprises the steps of:
    (a) determining an error concealment method according to said VP scanning result;
    (b) setting macroblock headers and other control variables corresponding to an error concealment method determined in said (a) step; and
    (c) carrying out a macroblock decoding or an error concealment,
    characterized by decoding a macroblock with only using a DC coefficient of an upper adjacent block for each block contained in said macroblock,
    wherein said VP scanning result in said step (a) informs that said macroblock is:
    included in a VP containing only a second part texture error,
    determined to be error-concealed in said VP,
    intra, and
    set with UIDV=0, and
    DC coefficients of upper adjacent blocks of said macroblock are available.

4. A method for decoding of video as claimed in claim 3, characterized by replacing a decoding result of a macroblock with that of previous frame at the same location,
    wherein said VP scanning result in said determining step (a) informs that said macroblock is:
    included in a VP containing only a second part texture error,
    determined to be error-concealed in said VP,
    intra, and
    set with UIDV=0, and
    DC coefficients of upper adjacent blocks of said macroblock are not available.

5. A method for decoding of video as claimed in claim 3, characterized by decoding a macroblock with only using the DC coefficients of current macroblock,
    wherein said VP scanning result in said determining step (a) informs that said macroblock is:
    included in a VP containing only a second part texture error,
    determined to be error-concealed in said VP,
    intra, and
    set with UIDV=1.

6. A method for decoding of video as claimed in claim 3, characterized by decoding a macroblock with only using a DC coefficient of an upper adjacent block for each block contained in said macroblock,
    wherein said VP scanning result in said determining step (a) informs that said macroblock is:
    included in a VP containing only a second part texture error,
    determined to be error-concealed in said VP, and
    inter, and
    DC coefficients of upper adjacent blocks of said macroblock are available.

7. A method for decoding of video as claimed in claim 3, characterized by replacing a decoding result of a macroblock with a decoding result of previous frame corresponding to a decoded motion vector,
    wherein said VP scanning result in said determining step (a) informs that said macroblock is:
    included in a VP containing only a second part texture error,
    determined to be error-concealed in said VP, and inter, and DC coefficients of upper adjacent blocks of said macroblock are not available.

8. A method for decoding of video as claimed in claim 3, characterized by decoding a macroblock with only using a DC coefficient of an upper adjacent block for each block contained in said macroblock, wherein said VP scanning result in said determining step (a) informs that said macroblock is:

included in a VP containing an overall second part error, an I-VOP, and set with UIDV=0, and DC coefficients of upper adjacent blocks of said macroblock are available.

9. A method for decoding of video as claimed in claim 3, characterized by replacing a decoding result of a macroblock with that of previous frame at the same location, wherein said VP scanning result in said determining step (a) informs that said macroblock is:

included in a VP containing an overall second part error, an I-VOP, and set with UIDV=0, and DC coefficients of upper adjacent blocks of said macroblock are not available.

10. A method for decoding of video as claimed in claim 3, characterized by decoding a macroblock with only using the DC coefficients of current macroblock, wherein said VP scanning result in said determining step (a) informs that said macroblock is:

included in a VP containing an overall second part error, an I-VOP, and set with UIDV=1.

11. A method for decoding of video as claimed in claim 3, characterized by decoding a macroblock with only using a DC coefficient of an upper adjacent block for each block contained in said macroblock, wherein said VP scanning result in said determining step (a) informs that said macroblock is:

included in a VP containing an overall second part error, a P-VOP, and intra, and DC coefficients of upper adjacent blocks of said macroblock are available.

12. A method for decoding of video as claimed in claim 3, characterized by replacing a decoding result of a macroblock with that of previous frame at the same location, wherein said VP scanning result in said determining step (a) informs that said macroblock is:

included in a VP containing an overall second part error, a P-VOP, and intra, and DC coefficients of upper adjacent blocks of said macroblock are not available.

13. A method for decoding of video as claimed in claim 3, characterized by decoding a macroblock with only using a DC coefficient of an upper adjacent block for each block contained in said macroblock, wherein said VP scanning result in said determining step (a) informs that said macroblock is:

included in a VP containing an overall second part error, a P-VOP, and inter, and DC coefficients of upper adjacent blocks of said macroblock are available.

14. A method for decoding of video as claimed in claim 3, characterized by replacing a decoding result of a macroblock with a decoding result of previous frame corresponding to a decoded motion vector, wherein said VP scanning result in said determining step (a) informs that said macroblock is:

included in a VP containing an overall second part error, a P-VOP, and inter, and DC coefficients of upper adjacent blocks of said macroblock are not available.

15. A method for decoding of video as claimed in claim 3, characterized by decoding a macroblock with only using a DC coefficient of an upper adjacent block for each block contained in said macroblock, wherein said VP scanning result in said determining step (a) informs that said macroblock is an I-VOP and included in a VP containing a first part error and an overall second part error, and DC coefficients of upper adjacent blocks of said macroblock are available.

16. A method for decoding of video as claimed in claim 3, characterized by replacing a decoding result of a macroblock with that of previous frame at the same location, wherein said VP scanning result in said determining step (a) informs that said macroblock is an I-VOP and included in a VP containing a first part error and an overall second part error, and DC coefficients of upper adjacent blocks of said macroblock are not available.

17. A method for decoding of video as claimed in claim 3, characterized by decoding a macroblock with only using a DC coefficient of an upper adjacent block for each block contained in said macroblock, wherein said VP scanning result in said determining step (a) informs that said macroblock is a P-VOP and included in a VP containing a first part error and an overall second part error, and DC coefficients of upper adjacent blocks of said macroblock are available.

18. A method for decoding of video as claimed in claim 3, characterized by replacing a decoding result of a macroblock with a decoding result of previous frame corresponding to a motion vector of upper adjacent block, wherein said VP scanning result in said determining step (a) informs that said macroblock is a P-VOP and included in a VP containing a first part error and an overall second part error, and DC coefficients of upper adjacent blocks of said macroblock are not available.

19. A method for decoding of video as claimed in claim 18, characterized by setting a motion vector to be (0, 0) in case that there exists no upper adjacent block for each block of said macroblock.

20. A method for decoding of video as claimed in claim 18, characterized by sharing a motion vector memory of a motion compensator, which outputs a finally decoded video, for using said motion vector of upper adjacent block for each block of said macroblock.

21. A method for decoding of video as claimed in claims 3, 6, 8, 11, 13, 15 or 17,
characterized by sharing a prediction memory of an inverse AC/DC coefficient predictor, which carries out an inverse process of AC/DC coefficient prediction by an encoder, for using said DC coefficient of upper adjacent block for each block of said macroblock.

22. A method for decoding of video as claimed in claims 3, 4, 6, 7, 8, 9, 11, 12, 13, 14, 15, 16, 17, or 18, characterized by:
using the same number of 1-bit DC coefficient availability information as the number of horizontal macroblocks in a frame for indicating the availability of a DC coefficient of upper adjacent block for each block of said macroblock;
setting said DC coefficient availability information corresponding to horizontal location of a macroblock to be 1 (one) for the case of a normally decoded intra macroblock;
setting said DC coefficient availability information corresponding to horizontal location of a macroblock to be 0 (zero) for the case of a macroblock error-concealed by upper adjacent DC coefficients;
not changing said DC coefficient availability information corresponding to horizontal location of a macroblock for the case of a macroblock error-concealed by a decoding result of previous frame at the same location;
setting said DC coefficient availability information corresponding to horizontal location of a macroblock to be 1 (one) for the case of a macroblock error-concealed by DC coefficients of current macroblock,
not changing said DC coefficient availability information corresponding to horizontal location of a macroblock for the case of a macroblock error-concealed by a decoding result of previous frame corresponding to motion vector of current macroblock; and
not changing said DC coefficient availability information corresponding to horizontal location of a macroblock for the case of a macroblock error-concealed by a decoding result of previous frame corresponding to motion vector of upper adjacent block.

* * * * *